(12) United States Patent
Ham

(10) Patent No.: US 11,396,743 B2
(45) Date of Patent: Jul. 26, 2022

(54) DRAIN FILTER WITH AIR PASSAGE

(71) Applicant: Kyongjae Ham, Gyeonggi-do (KR)

(72) Inventor: Kyongjae Ham, Gyeonggi-do (KR)

( * ) Notice: Subject to any disclaimer, the term of this patent is extended or adjusted under 35 U.S.C. 154(b) by 441 days.

(21) Appl. No.: 16/662,465

(22) Filed: Oct. 24, 2019

(65) Prior Publication Data

US 2020/0224398 A1 Jul. 16, 2020

(30) Foreign Application Priority Data

Jan. 16, 2019 (KR) .................. 10-2019-0005708

(51) Int. Cl.
*E03C 1/264* (2006.01)
*B01D 29/03* (2006.01)

(52) U.S. Cl.
CPC .............. *E03C 1/264* (2013.01); *B01D 29/03* (2013.01); *B01D 2201/184* (2013.01)

(58) Field of Classification Search
CPC ........................................................ E03C 1/264
USPC ...................................................... 4/286–295
See application file for complete search history.

(56) References Cited

U.S. PATENT DOCUMENTS

| 964,954 | A |  | 7/1910 | Coles |  |
|---|---|---|---|---|---|
| 3,982,289 | A | * | 9/1976 | Robbins | ................ E03C 1/264 |
|  |  |  |  |  | 4/292 |
| 4,725,352 | A | * | 2/1988 | Haliotis | ............... E04H 4/1272 |
|  |  |  |  |  | 137/625.3 |
| 5,830,350 | A | * | 11/1998 | Voss | ...................... E04H 4/1272 |
|  |  |  |  |  | 4/290 |
| 8,636,899 | B2 | * | 1/2014 | Tesauro | ................... E04H 4/14 |
|  |  |  |  |  | 4/290 |
| 9,347,234 | B2 | * | 5/2016 | Voss Weyman | ...... E04H 4/1272 |
| 9,976,295 | B1 | * | 5/2018 | Booker, Jr. | ............... E03C 1/20 |
| 2002/0056675 | A1 |  | 5/2002 | Hegde |  |
| 2015/0083170 | A1 |  | 3/2015 | Durham et al. |  |
| 2018/0202136 | A1 | * | 7/2018 | Karnegie | ................ E03C 1/264 |

FOREIGN PATENT DOCUMENTS

| CN | 106725213 | 5/2017 |
|---|---|---|
| JP | H07289816 | 11/1995 |
| JP | 09-225214 | 9/1997 |
| JP | H10-211954 | 8/1998 |
| JP | H11140936 | 5/1999 |
| JP | 2003112173 | 4/2003 |
| JP | A 2008069573 | 3/2008 |
| JP | A 2011021412 | 2/2011 |

(Continued)

OTHER PUBLICATIONS

European Extended Search Report in Patent Application No. 20152274. 5, dated May 13, 2020, 7 pages.

*Primary Examiner* — Christine J Skubinna
(74) *Attorney, Agent, or Firm* — Fish & Richardson P.C.

(57) ABSTRACT

A drain filter assembly includes a screen filter that is configured to be installed at a drain and that is configured to block foreign substances in liquid while the liquid passes therethrough. The screen filter includes: a plurality of filter holes configured to allow passage of the liquid into the drain, where each of the plurality of filter holes has a pore size that is less than sizes of the foreign substances; and an air communication hole configured to allow passage of air the liquid passes through the plurality of filter holes. A diameter of the air communication hole is greater than the pore size of each of the plurality of filter holes.

20 Claims, 6 Drawing Sheets

(56) References Cited

FOREIGN PATENT DOCUMENTS

| KR | 20-0224004 | 5/2001 |
| KR | 1020090105519 | 10/2009 |
| KR | 101415336 | 7/2014 |
| WO | WO 95/24255 | 9/1995 |
| WO | WO 2018/172872 | 9/2018 |

* cited by examiner

DRAIN FILTER WITH AIR PASSAGE

CROSS-REFERENCE TO RELATED APPLICATION

This application claims priority to Korean Patent Application No. 10-2019-0005708, filed on Jan. 16, 2019, whose entire content is hereby incorporated by reference.

TECHNICAL FIELD

The present disclosure relates to a drain filter and, more specifically, a drain filter with an air passage.

BACKGROUND

When water is drained from a basin through a drain hole, water may slowly drift down and swirl around the drain hole. In the draining process, an air column may be generated at an entrance of the drain hole, and then water may be drained quickly.

While a water supply pipe guides fluid driven by a pressure difference in fluid, fluid flow in a drain pipe is complex flow that includes a relatively large amount of air.

SUMMARY

The present disclosure describes a filter assembly that may improve an efficiency and draining ability of a screen filter, which may be used for a drainage facility in home or industrial applications.

According to one aspect of the subject matter described in this application, a drain filter assembly includes a screen filter that is configured to be installed at a drain and that is configured to block foreign substances in liquid while the liquid passes through the screen filter. The screen filter includes: a plurality of filter holes configured to allow passage of the liquid into the drain, where each of the plurality of filter holes has a pore size that is less than sizes of the foreign substances; and an air communication hole configured to allow passage of air while the liquid passes through the plurality of filter holes. A diameter of the air communication hole is greater than the pore size of each of the plurality of filter holes.

Implementations according to this aspect may include one or more of the following features. For example, the screen filter may be configured to be installed at an inlet of the drain. In some implementations, the drain filter assembly may further include an extension air passage that is connected to the air communication hole, that is coupled to the screen filter, and that extends vertically away from the screen filter.

In some implementations, the extension air passage may pass through the screen filter and extend to the inlet of the drain. In some examples, the extension air passage may extend in a first direction upward from the screen filter and in a second direction downward from the screen filter into the drain. In some examples, the drain filter assembly may further include an end screen filter that covers an upper end of the extension air passage.

In some examples, the extension air passage may include a sidewall coupled to the screen filter and configured to block entrance of liquid therethrough, where the sidewall of the extension air passage defines a first aperture disposed vertically above an upper surface of the screen filter and a second aperture disposed vertically below a lower surface of the screen filter. The extension air passage is configured to, while the liquid passes through the plurality of filter holes, communicate air between the first aperture and the second aperture.

In some implementations, at least one of (i) a vertical distance between the first aperture and the upper surface of the screen filter or (ii) a vertical distance between the second aperture and the lower surface of the screen filter may be greater than a thickness of the screen filter between the upper surface and the lower surface of the screen filter. In some implementations, the second aperture may be configured to be inserted into the drain based on the screen filter being installed at the inlet of the drain.

In some examples, where the screen filter assembly is installed in a tub having the drain, the first aperture may be positioned vertically higher than a water level of the tub, and the second aperture may be positioned vertically below the lower surface of the screen filter to minimize interference between liquid flow through the screen filter and air flow through the extension air passage.

In some implementations, the screen filter may include a frame portion that extends laterally outward from an outer periphery of the screen filter and that is configured to rest on a surface that defines the inlet of the drain, where the plurality of filter holes are defined in an area laterally inside of the frame portion. In some implementations, the screen filter may include a coupling portion that protrudes downward from the lower surface of the screen filter and that is configured to insert into the drain and restrict movement of the screen filter in the inlet of the drain.

In some examples, a first length of the extension air passage between the first aperture and the upper surface of the screen filter may be different from a second length of the extension air passage between the second aperture and the lower surface of the screen filter. In some examples, the air communication hole may be defined at a center of the screen filter, and a ratio of the diameter of the air communication hole with respect to the pore size may be greater than two.

In some implementations, the extension air passage may extend upward from the screen filter away from the drain, and a bottom end of the extension air passage may be coupled to the screen filter. In some examples, the drain filter assembly may further include an end screen filter that covers an upper end of the extension air passage. In some examples, the extension air passage may include a sidewall that extends upward from the bottom end of the extension air passage, where the sidewall is configured to block entrance of liquid therethrough, where the sidewall of the extension air passage defines a first aperture disposed at a top end of the extension air passage, and the first aperture is configured to, while allowing the liquid to pass through the plurality of filter holes, communicate air with the air communication hole.

In some examples, the screen filter may include a frame portion that extends laterally outward from an outer periphery of the screen filter and that is configured to rest on a surface that defines the inlet of the drain, and the plurality of filter holes are defined at an area laterally inside of the frame portion. In some examples, the screen filter may include a coupling portion that protrudes downward from a lower surface of the screen filter and that is configured to insert into the drain and restrict movement of the screen filter in the inlet of the drain.

In some implementations, the extension air passage may extend below the screen filter into the drain, and a top end of the extension air passage is coupled to the screen filter. In some examples, the extension air passage may include a sidewall that extends downward from the top end of the extension air passage, where the sidewall is configured to block entrance of liquid therethrough, and the sidewall of the extension air passage defines a second aperture disposed at a bottom end of the extension air passage, and the second aperture is configured to, while allowing the liquid to pass through the plurality of filter holes, communicate air with the air communication hole.

In some implementations, the screen filter may include a frame portion that extends laterally outward from an outer periphery of the screen filter and that is configured to rest on a surface that defines the inlet of the drain, where the plurality of filter holes are defined in an area laterally inside of the frame portion. In some implementations, the screen filter may include a coupling portion that protrudes downward from a lower surface of the screen filter and that is configured to insert into the drain and restrict movement of the screen filter in the inlet of the drain.

In some implementations, the filter assembly may facilitate maintenance of drainage-related facilities and improve drainage performance using a screen filter with an air passage.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

The present disclosure describes a drain filter assembly that can improve the efficiency and draining ability of a screen filter, which may be used in a home or various industrial facilities drainage facilities.

A screen filter may be used at a drainage inlet and configured to filter or block foreign substance such as suspended matter and debris in liquid, which sometimes obstruct normal flow of liquid through the screen filter and reduce the efficiency of the screen filter and drainage efficiency.

When an air passage is applied to the screen filter, the air passage may change the flow characteristics of fluid in a drainage pipe due to an influence of air communicated through the air passage.

In some examples, where the screen filter with the air passage is installed at an inlet of the drainage pipe, the flow velocity in the drainage pipe may increase, and the floating residues attached to the screen filter may be washed to thereby improve the efficiency of the screen filter and increase the drainage capacity.

Figure 1:
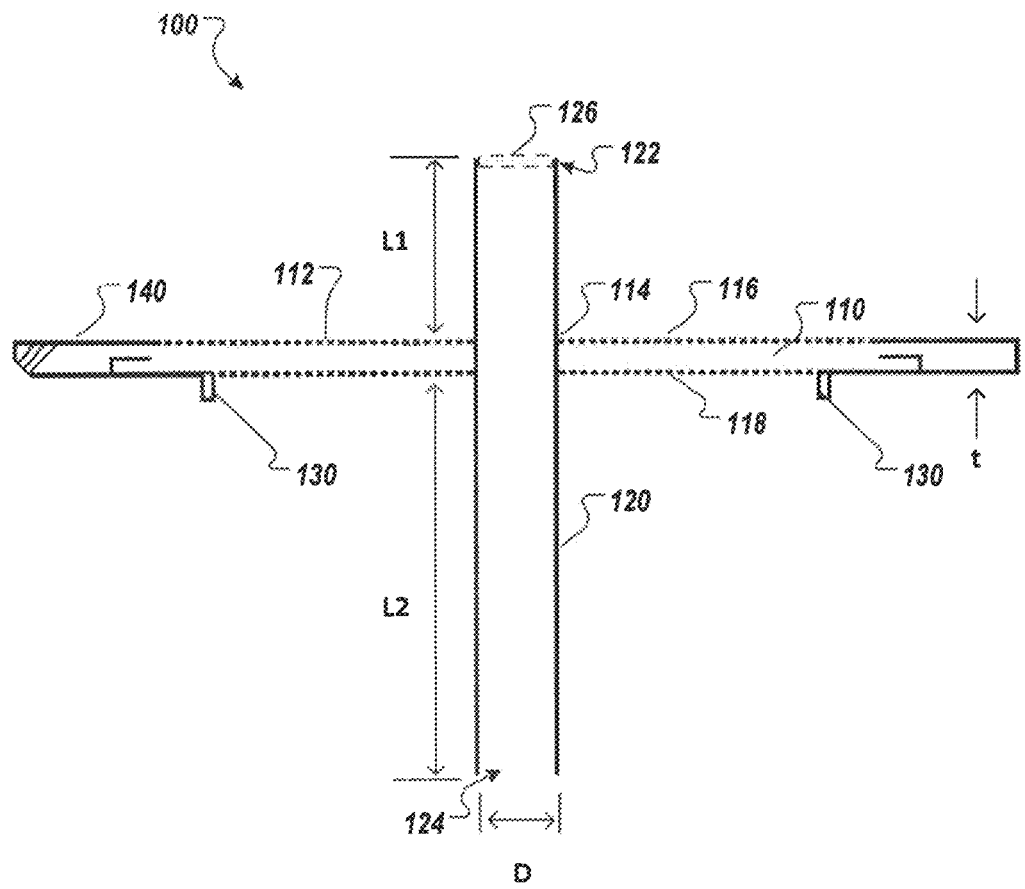
FIG. 1 is a sectional view showing an example of a screen filter assembly with an air passage.

FIG. 1 is a sectional view showing an example of a screen filter assembly with an air passage.

For example, the screen filter assembly 100 may include a screen filter 110 and an extension air passage 120 that extends from the screen filter 110. The screen filter 110 may be a screen mesh that defines a plurality of filter holes 112 and an air communication hole 114. The plurality of filter holes 112 may pass through an upper surface 116 and a lower surface 118 of the screen filter 110. The plurality of filter holes 112 have one or more pore sizes that are less than sizes of the foreign substances, to thereby restrict the foreign substances from passing the screen filter 110.

In some implementations, a diameter of the air communication hole 114 may be greater than a pore size of each of the plurality of filter holes 112. For example, a ratio of the diameter of the air communication hole 114 with respect to the pore size may be greater than two. In some cases, the diameter of the air communication hole 114 may be similar (e.g., the ratio ~1) to the pore size as along as the air communication hole 114 can secure air flow therethrough. For example, the pore size of each of the filter holes 112 may be in a range from 0.2 mm to 5 mm, and the diameter of the air communication hole 114 may be in a range from 0.4 mm to 20 mm.

The screen filter assembly 100 may be able to increase a flow rate through the screen filter 110 by communicating air through the air communication hole 114 while the plurality of filter holes 112 filter foreign substances in liquid passing therethrough.

In some examples, the diameter of the air communication hole 114 is equal to a diameter D of the extension air passage 120. In some examples, the diameter D of the extension air passage 120 may be determined based on an air column size of a swirl pattern generated during draining liquid without an air passage or a screen filter.

The extension air passage 120 is connected to the air communication hole 114 and extends away from the screen filter 110. For instance, the extension air passage 120 may include a sidewall that extends in an upward direction, in a downward direction, or in both directions. The extension air passage 120 may define a first aperture 122 disposed vertically above the upper surface 116 of the screen filter 110 and a second aperture 124 disposed vertically below the lower surface 118 of the screen filter 110. The extension air passage 120 may pass through the screen filter 110 and an inlet of a drainage pipe (see FIG. 2). Each of the first aperture 122 and the second aperture 124 may receive or discharge air based on an air pressure difference between an outside of the drain and an inside of the drain.

In some implementations, an end screen filter 126 may be installed at the first aperture 122 so that the end screen filter 126 may block foreign substances when liquid passes through the extension air passage 120. For instance, when a liquid level is vertically higher than the first aperture 122, the extension air passage 120 may guide the liquid to the drain while the screen filter 110 and the end screen filter 126 block foreign substances.

When liquid passes through the screen filter 110, the first aperture 122 and the second aperture 124 are in communication with each other, and thus air pressure at an upper side of the screen filter 110 may be equal to air pressure at a lower side of the screen filter 110. In this case, a velocity of liquid passing through the filter holes 112 may increase.

In some implementations, the extension air passage 120 may extend in a first direction upward from the screen filter 110 away from a drain and in a second direction downward from the screen filter 110 into the drain. In some examples, each of the first direction and the second direction may be orthogonal to the upper surface 116 and the lower surface 118. In some examples, the extension air passage 120 may be inclined with respect to the upper surface 116 and the lower surface 118. In other examples, the extension air passage 120 may be curved. For example, a top end of the extension air passage 120 may be curved downward so that water may not enter the first aperture 122.

In some implementations, the sidewall of the extension air passage 120 may be coupled to the screen filter 110 and configured to block entrance of liquid therethrough. For instance, the extension air passage 120 may be a pipe that is made of a plastic material, an elastic material, a ceramic material, or a metallic material and that is not perforated. In some examples, the extension air passage 120 may be made by three-dimensional (3D) printing. The extension air passage 120 may have a circular shape or an angular shape. For instance, a cross section of the extension air passage 120 may have a circle, an oval, or a polygon.

The first aperture 122 may be defined vertically above the upper surface 116 of the screen filter 110 and configured to, based on liquid passing through the plurality of filter holes 112, communicate air with the second aperture 124. The second aperture 124 may be disposed vertically below the lower surface 118 of the screen filter 110 and configured to, while allowing the liquid to pass through the plurality of filter holes 112, communicate air with the first aperture 122.

In some examples, a vertical distance (L1+L2) between the first aperture 122 and the second aperture 124 is greater than a thickness (t) of the screen filter 110 between the upper surface 116 and the lower surface 118 of the screen filter. In some cases, the vertical distance L1 between the first aperture 122 and the upper surface 116 may be greater than the thickness of the screen filter 110. In some cases, the vertical distance L2 between the second aperture 124 and the lower surface 118 may be greater than the thickness of the screen filter 110. In some examples, the second aperture 124 may be inserted into the drain based on the screen filter 110 being installed at the inlet of the drain. In some examples, L2 may be greater than L1 (see FIG. 1). In other examples, L2 may be less than L1 (see FIG. 4). In some cases, L1 and L2 may be equal to each other. In some cases, one or both of L1 and L2 may be zero (see FIGS. 3, 5, and 6).

In some examples, where the screen filter assembly 100 is installed in a tub having a drain, the first aperture 122 may be positioned vertically higher than a water level of the tub above the upper surface 116 of the screen filter 110, and the second aperture 124 may be positioned vertically below the lower surface 118 of the screen filter 110 to minimize interference between liquid flow through the screen filter 110 and air flow through the extension air passage 120. In some cases, the first aperture 122 may be positioned below a water level of the tub when the tub is filled with water, and then may become exposed above the water level as water is discharged through the drain. In some cases, the first aperture 122 may be positioned at a predetermine height that is vertically higher than or equal to a maximum water level of the tub such that the first aperture 122 is always exposed.

For example, in some cases, the vertical distances L1, L2, or both may be in a range from 5 mm to 100 mm. The thickness t of the screen filter 110 may be 0.2 mm to 10 mm.

In some implementations, the screen filter assembly 100 may include a coupling portion 130 that protrudes downward from the lower surface 118 of the screen filter 110. For instance, the coupling portion 130 may have a ring shape that extends along a circumference of the screen filter 110. In some cases, the coupling portion 130 may be one or more pins that are arranged along the circumference of the screen filter 110 and that are space apart from each other. The coupling portion 130 may be inserted into a drainage pipe when the screen filter 110 is installed in an inlet of the drainage pipe. The coupling portion 130 may be configured to restrict movement (e.g., lateral movement) of the screen filter 110 in the inlet of the drainage pipe.

In some implementations, the screen filter assembly 100 may include a frame portion 140 that extends laterally outward from an outer periphery of the screen filter 110 and that is configured to rest on a surface that defines the inlet of the drainage pipe. The plurality of filter holes 112 are defined in an area laterally inside of the frame portion 140. For instance, the frame portion 140 may have a rim shape that extends along a circumference of the screen filter 110. In some examples, the frame portion 140 may be configured to directly face and contact a surface of the drain when the screen filter assembly 100 is installed on the drain.

The air communication hole 114 may be defined at a center of the screen filter 110. For instance, the screen filter 110 may have a circular shape and the air communication hole 114 may be defined at the center of the circular shape and the plurality of filter holes 112 are defined in an area around the air communication hole 114. The extension air passage 120 may also pass through the center of the screen filter 110. That is, the screen filter 110, the extension air passage 120, and the air communication hole 114 may be coaxial. In some examples, the air communication hole 114 may be defined at a position offset from the center of the screen filter 110. For instance, the air communication hole 114 may defined between the center of the screen filter 110 and an outer circumference of the screen filter 110.

Figure 2:
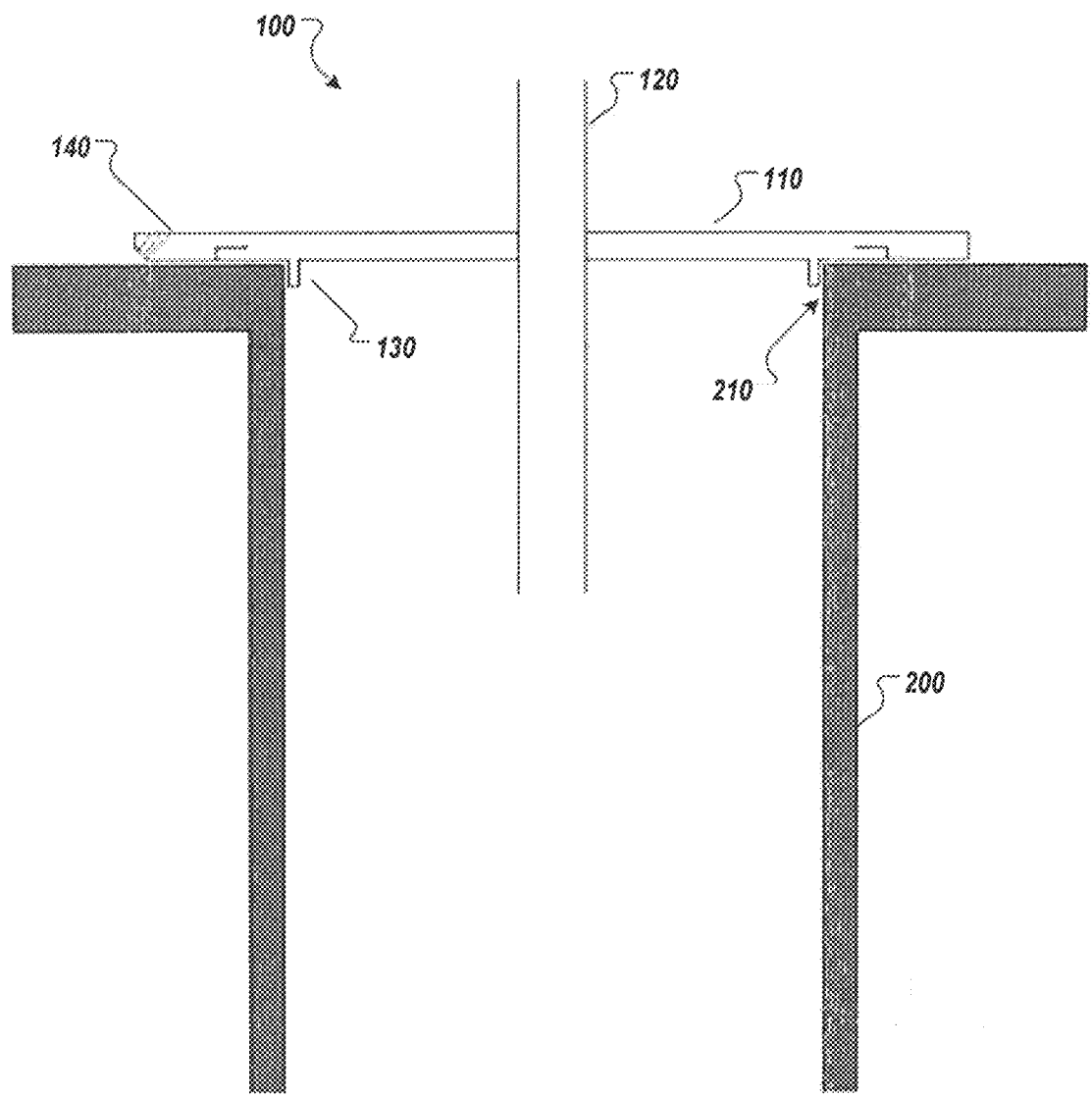
FIG. 2 is a sectional view showing the screen filter assembly of FIG. 1 mounted in an example drain.

FIG. 2 is a sectional view showing the screen filter assembly of FIG. 1 mounted in an example drain.

For example, the screen filter assembly 100 may be installed at an inlet 210 of a drain 200. The drain 200 may be a drainage pipe connected to a basin, a sink, a tub, or the like. The frame portion 140 of the screen filter assembly 100 may rest on an upper surface of the drain 200, and the coupling portion 130 may be inserted into the drain 200. In some examples, the coupling portion 130 may be spaced apart from an inner side wall of the drain 200. In other examples, the coupling portion 130 may contact the inner side wall of the drain 200. The screen filter assembly 100 may be rotatable in the drain 200. Lateral movement of the screen filter assembly 100 may be limited within a gap between the coupling portion 130 and the inner side wall of the drain 200.

Figure 3:
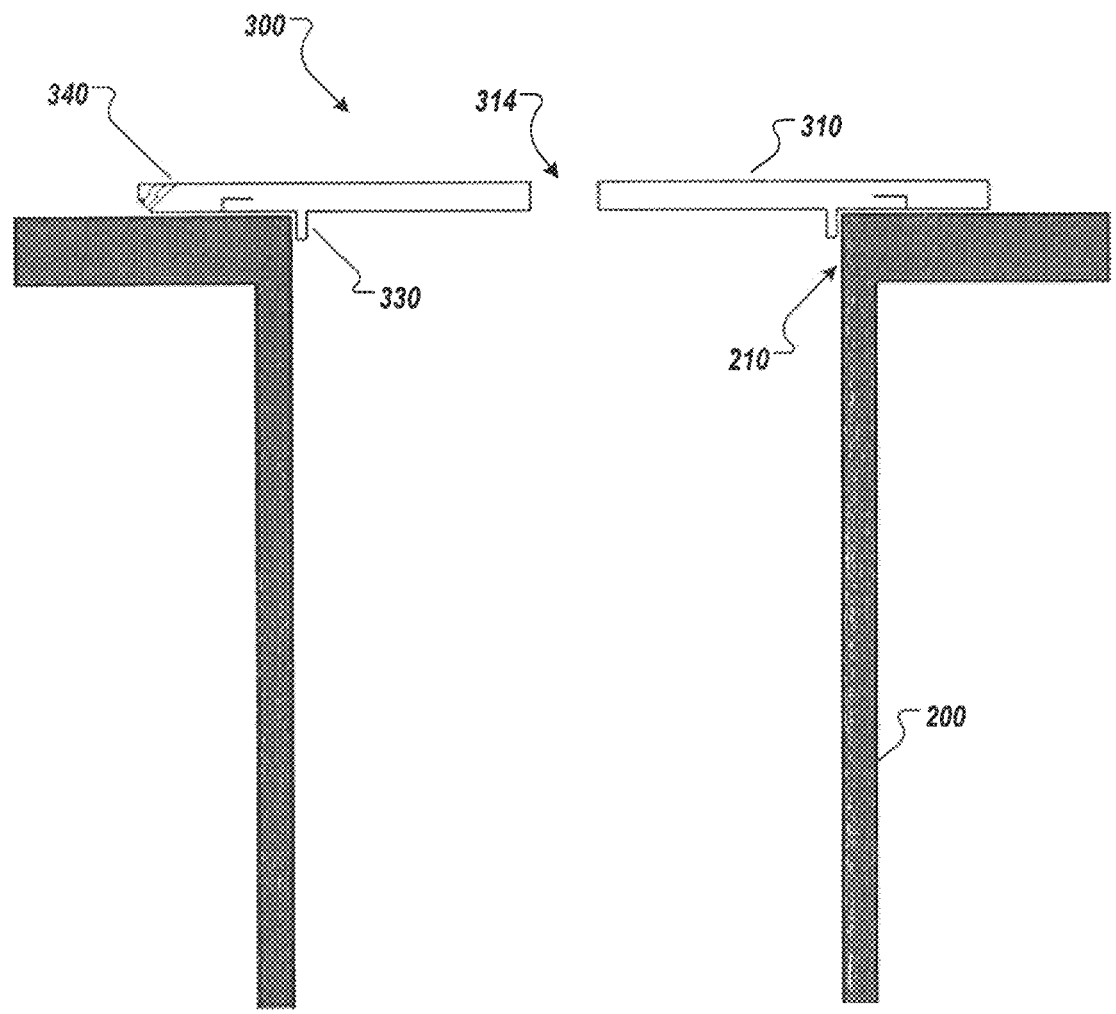
FIG. 3 is a sectional view showing an example of a screen filter assembly having an air communication hole.

FIG. 3 is a sectional view showing an example of a screen filter assembly having an air communication hole.

For example, the screen filter assembly 300 may be installed at the inlet 210 of the drain 200. The screen filter assembly 300 may include a screen filter 310 that defines a plurality of filter holes and an air communication hole 314. The air communication hole 314 is configured to communicate not only air but also liquid therethrough, which may improve the drainage ability. As discussed above with the screen filter 110, an opening size of the air communication hole 314 may be greater than a pore size of each of the plurality of filter holes of the screen filter. Thus, in some cases, a first portion of foreign substances may pass through the air communication hole 314 while a second portion of foreign substances is blocked by the plurality of filter holes of the screen filter 310.

The screen filter assembly 300 may include components similar to those of the screen filter assembly 100 discussed above with FIGS. 1 and 2. For instance, the screen filter assembly 300 may include one or more of a coupling portion 330, a frame portion 340, and an extension air passage. In some implementations, as shown in FIG. 3, the screen filter assembly 300 may not include an air passage like the extension air passage 120, but the air communication hole 314 may function as an air passage that facilitates drainage of liquid and improves drainage ability.

Figure 4:
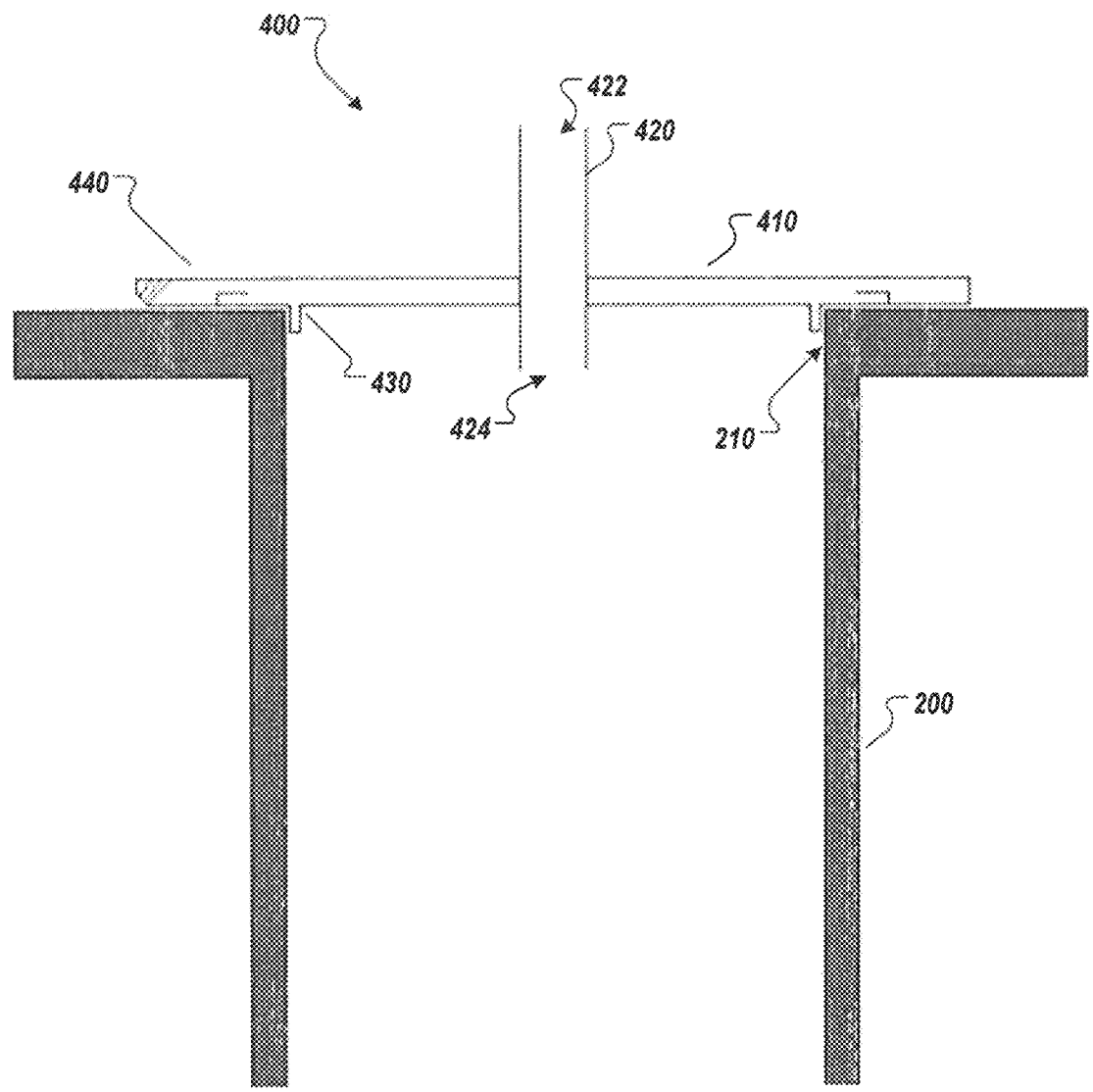
FIG. 4 is a sectional view showing an example of a screen filter assembly having an air passage that extends in upper and lower directions.

FIG. 4 is a sectional view showing an example of a screen filter assembly having an air passage that extends in upper and lower directions.

For example, the screen filter assembly 400 may be installed at the inlet 210 of the drain 200, and may include a screen filter 410, an extension air passage 420, a coupling portion 430, and a frame portion 440. These components of the screen filter assembly 400 may include features similar to those of the screen filter 110, the extension air passage 120, the coupling portion 130, and the frame portion 140 as described above with FIGS. 1 and 2. For example, the extension air passage 420 may extend upward and downward from the screen filter 410.

In some examples, unlike the example shown in FIG. 1, a distance between a first aperture 422 and an upper surface of the screen filter 410 is greater than a distance between a second aperture 424 and a lower surface of the screen filter 410. A sidewall of the extension air passage 420 can restrict inflow of the fluid therethrough while the screen filter 410 allows passage of liquid. An upper portion of the extension air passage 420 may minimize interference between air and liquid flow passing through the screen filter 410. In addition, a lower portion of the extension air passage 420 may minimize interference between air and liquid flow that has passed through the screen filter 410.

Figure 5:
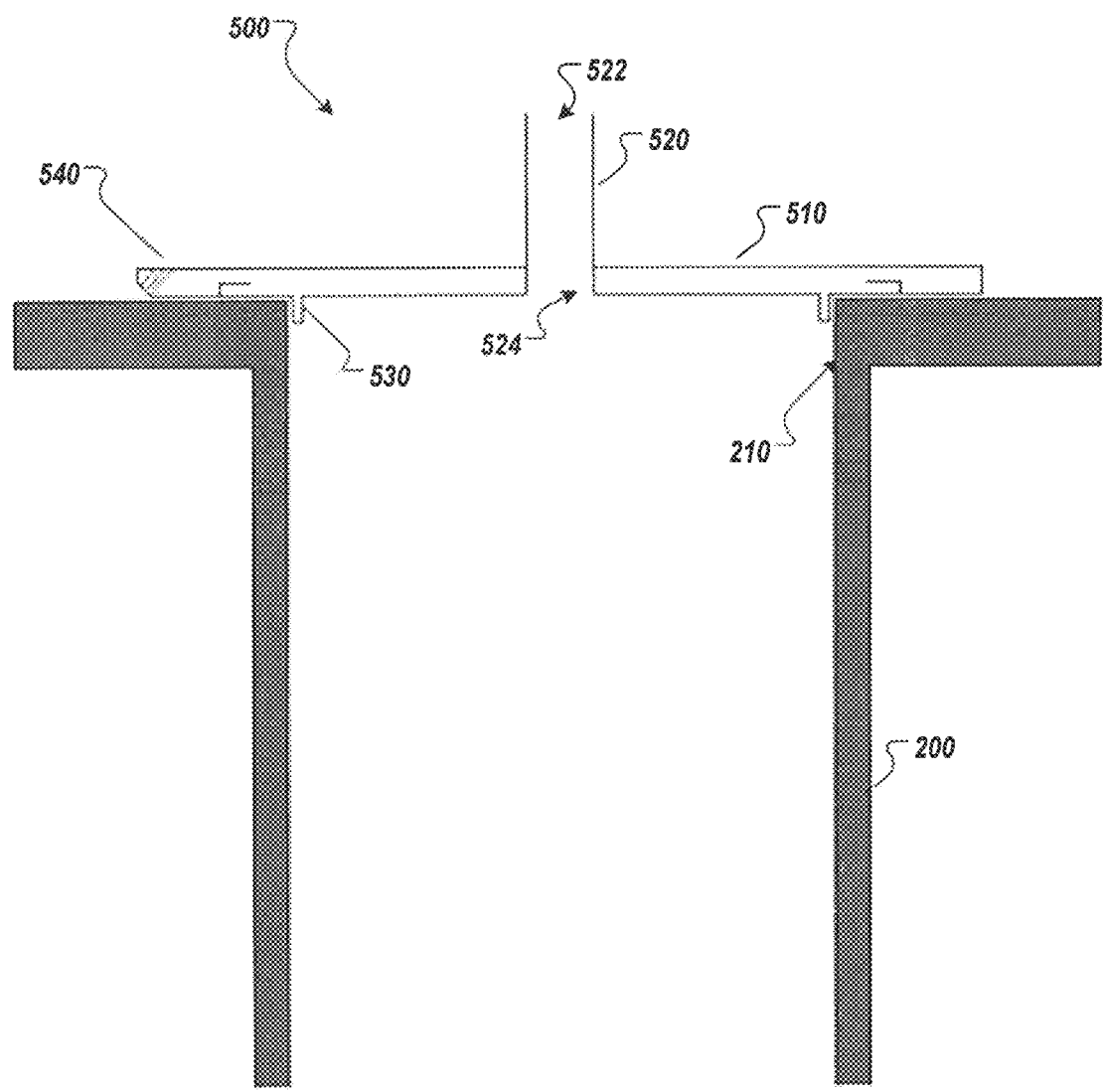
FIG. 5 is a sectional view showing an example of a screen filter assembly having an air passage that extends upward.

FIG. 5 is a sectional view showing an example of a screen filter assembly having an air passage that extends upward.

For example, the screen filter assembly 500 may be installed at the inlet 210 of the drain 200, and may include a screen filter 510, an extension air passage 520, a coupling portion 530, and a frame portion 540. In some implementations, these components of the screen filter assembly 500 may include features similar to those of the screen filter 110, the extension air passage 120, the coupling portion 130, and the frame portion 140 as described above with FIGS. 1 and 2. In some implementations, as shown FIG. 5, the extension air passage 520 may be attached to the screen filter 510 and extend only upward from the screen filter 510.

A first aperture 522 may be disposed above an upper surface of the screen filter 510, and a second aperture 524 may be coupled to the screen filter 510 and configured to communicate with an air communication hole defined at the screen filter 510. That is, the second aperture 524 may correspond to the air communication hole defined at the screen filter 510. A sidewall of the extension air passage 520 may restrict inflow of liquid therethrough while liquid passes through the screen filter 510 downward.

Figure 6:
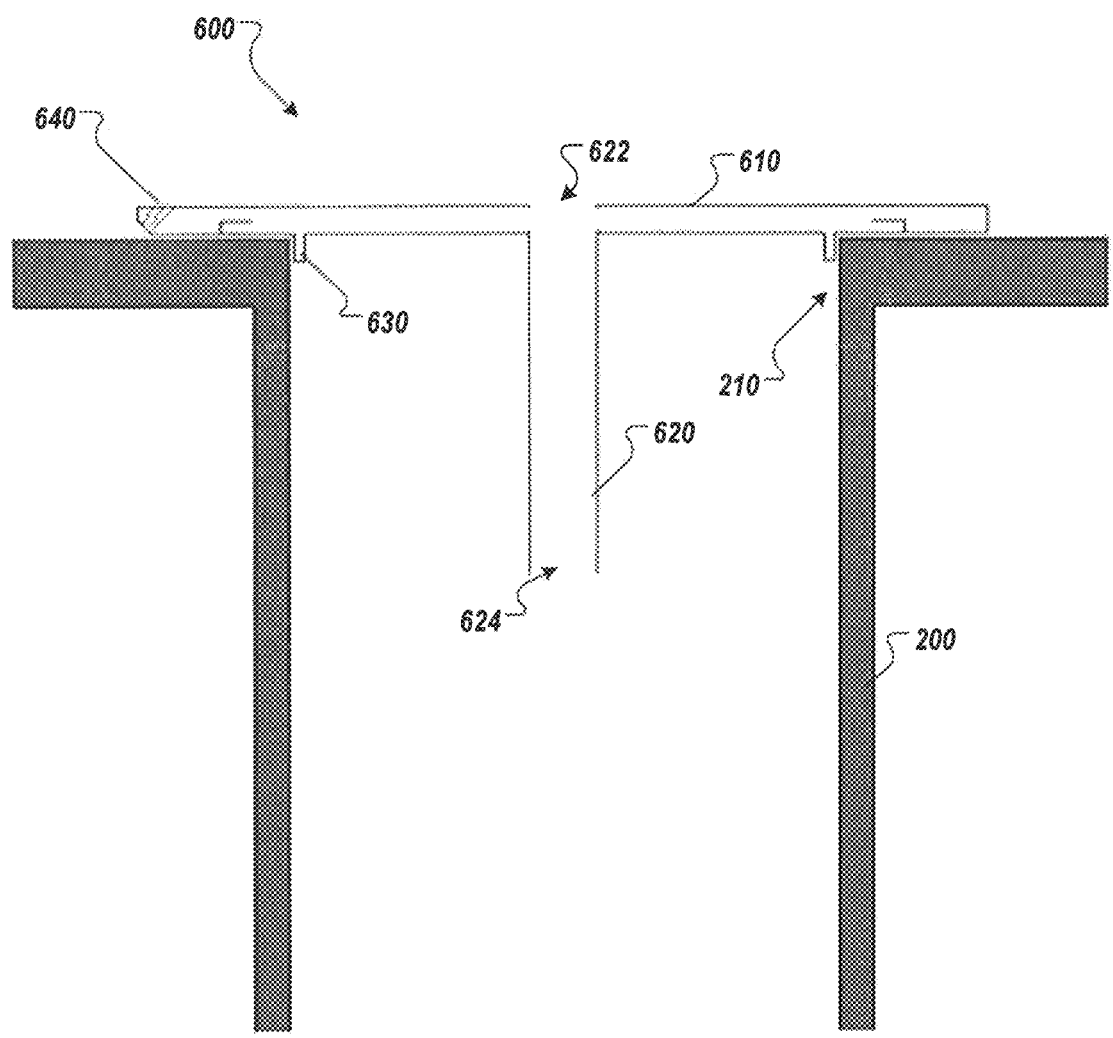
FIG. 6 is a sectional view showing an example of a screen filter assembly having an air passage that extends downward.

FIG. 6 is a sectional view showing an example of a screen filter assembly having an air passage that extends downward.

For example, the screen filter assembly 600 may be installed at the inlet 210 of the drain 200, and may include a screen filter 610, an extension air passage 620, a coupling portion 630, and a frame portion 640. In some implementations, these components of the screen filter assembly 600 may include features similar to those of the screen filter 110, the extension air passage 120, the coupling portion 130, and the frame portion 140 as described above with FIGS. 1 and 2. In some implementations, as shown FIG. 6, the extension air passage 620 may be attached to the screen filter 610 and extend only downward from the screen filter 610 into the drain 200.

A second aperture 624 may be disposed vertically below a lower surface of the screen filter 610, and a first aperture 622 may be coupled to the screen filter 610 and configured to communicate with an air communication hole defined at the screen filter 610. That is, the first aperture 622 may correspond to the air communication hole defined at the screen filter 610. A sidewall of the extension air passage 620 may restrict inflow of liquid therethrough while liquid passes through the screen filter 610 downward. The extension air passage 620 may minimize interference between air and liquid flow that has passed through the screen filter 610.

In some examples, the screen filter 610 may extend across the first aperture 622 to thereby block foreign substances while communicating liquid and air therethrough.

All examples described herein are merely to describe the present disclosure in greater detail. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

What is claimed is:

1. A drain filter assembly comprising:
   a screen filter that is configured to be installed at a drain and that is configured to block foreign substances in liquid while the liquid passes therethrough, the screen filter defining:
     a plurality of filter holes that pass through an upper surface and a lower surface of the screen filter and are configured to allow passage of the liquid into the drain, each of the plurality of filter holes having a pore size that is less than sizes of the foreign substances; and
     an air communication hole that passes through the upper surface and the lower surface of the screen filter and is configured to allow passage of air while the liquid passes through the plurality of filter holes, the air communication hole being defined at a center of each of the upper surface and the lower surface of the screen filter,
   wherein a diameter of the air communication hole is greater than the pore size of each of the plurality of filter holes, and
   wherein at least a portion of the lower surface of the screen filter is configured to rest on a surface that defines an inlet of the drain.

2. The drain filter assembly of claim 1, further comprising:
   an extension air passage that is connected to the air communication hole, that is coupled to the screen filter, and that extends vertically away from the screen filter.

3. The drain filter assembly of claim 2, wherein the extension air passage passes through the screen filter and extends to the inlet of the drain.

4. The drain filter assembly of claim 3, wherein the extension air passage extends in a first direction upward from the screen filter and in a second direction downward from the screen filter into the drain, and wherein the drain filter assembly further comprises an end screen filter that covers an upper end of the extension air passage.

5. The drain filter assembly of claim 4, wherein the extension air passage comprises a sidewall coupled to the screen filter and configured to block entrance of liquid therethrough,
wherein the sidewall of the extension air passage defines a first aperture disposed vertically above the upper surface of the screen filter and a second aperture disposed vertically below the lower surface of the screen filter,
wherein the extension air passage is configured to, while the liquid passes through the plurality of filter holes, communicate air between the first aperture and the second aperture.

6. The drain filter assembly of claim 5, wherein the drain filter assembly is configured to be installed in a tub having the drain, and
wherein the first aperture is positioned vertically higher than a water level of the tub, and the second aperture is positioned vertically below the lower surface of the screen filter to minimize interference between liquid flow through the screen filter and air flow through the extension air passage.

7. The drain filter assembly of claim 5, wherein the second aperture is configured to be inserted into the drain based on the screen filter being installed at the inlet of the drain.

8. The drain filter assembly of claim 5, wherein the screen filter comprises:
a frame portion that extends laterally outward from an outer periphery of the screen filter and that is configured to rest on the surface that defines the inlet of the drain, and
wherein the plurality of filter holes are defined in an area laterally inside of the frame portion.

9. The drain filter assembly of claim 5, wherein the screen filter comprises:
a coupling portion that protrudes downward from the lower surface of the screen filter and that is configured to insert into the drain and restrict movement of the screen filter in the inlet of the drain.

10. The drain filter assembly of claim 5, wherein a first length of the extension air passage between the first aperture and the upper surface of the screen filter is different from a second length of the extension air passage between the second aperture and the lower surface of the screen filter.

11. The drain filter assembly of claim 1,
wherein a ratio of the diameter of the air communication hole with respect to the pore size is greater than two.

12. The drain filter assembly of claim 2, wherein the extension air passage extends upward from the screen filter away from the drain,
wherein a bottom end of the extension air passage is coupled to the screen filter, and
wherein the drain filter assembly further comprises an end screen filter that covers an upper end of the extension air passage.

13. The drain filter assembly of claim 12, wherein the extension air passage comprises a sidewall that extends upward from the bottom end of the extension air passage, the sidewall being configured to block entrance of liquid therethrough, and
wherein the sidewall of the extension air passage defines a first aperture disposed at a top end of the extension air passage, the first aperture being configured to, while the liquid passes through the plurality of filter holes, communicate air with the air communication hole.

14. The drain filter assembly of claim 12, wherein the screen filter comprises:
a frame portion that extends laterally outward from an outer periphery of the screen filter and that is configured to rest on the surface that defines the inlet of the drain, and
wherein the plurality of filter holes are defined at an area laterally inside of the frame portion.

15. The drain filter assembly of claim 12, wherein the screen filter comprises:
a coupling portion that protrudes downward from the lower surface of the screen filter and that is configured to insert into the drain and restrict movement of the screen filter in the inlet of the drain.

16. The drain filter assembly of claim 2, wherein the extension air passage extends downward of the screen filter into the drain, and
wherein a top end of the extension air passage is coupled to the screen filter.

17. The drain filter assembly of claim 16, wherein the extension air passage comprises a sidewall that extends downward from the top end of the extension air passage, the sidewall being configured to block entrance of liquid therethrough, and
wherein the sidewall of the extension air passage defines a second aperture disposed at a bottom end of the extension air passage, the second aperture being configured to, while the liquid passes through the plurality of filter holes, communicate air with the air communication hole.

18. The drain filter assembly of claim 16, wherein the screen filter comprises:
a frame portion that extends laterally outward from an outer periphery of the screen filter and that is configured to rest on the surface that defines the inlet of the drain, and
wherein the plurality of filter holes are defined in an area laterally inside of the frame portion.

19. The drain filter assembly of claim 16, wherein the screen filter comprises:
a coupling portion that protrudes downward from the lower surface of the screen filter and that is configured to insert into the drain and restrict movement of the screen filter in the inlet of the drain.

20. The drain filter assembly of claim 1, wherein the lower surface of the screen filter defines a horizontal plane that is flat and extends across the inlet of the drain.

* * * * *